(12) United States Patent
Ishihara et al.

(10) Patent No.: US 7,957,090 B2
(45) Date of Patent: Jun. 7, 2011

(54) SEEK CONTROL APPARATUS AND METHOD FOR GENERATING CONTROL DATA FOR SEEK CONTROL

(75) Inventors: Yoshiyuki Ishihara, Kawasaki (JP); Shinji Takakura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 299 days.

(21) Appl. No.: 12/257,076

(22) Filed: Oct. 23, 2008

(65) Prior Publication Data

US 2009/0109567 A1 Apr. 30, 2009

(30) Foreign Application Priority Data

Oct. 26, 2007 (JP) ................................. 2007-278383

(51) Int. Cl.
*G11B 5/55* (2006.01)
(52) U.S. Cl. .................................................. 360/78.07
(58) Field of Classification Search .......................... None
See application file for complete search history.

(56) References Cited

U.S. PATENT DOCUMENTS

| | | | |
|---|---|---|---|
| 5,151,639 A | 9/1992 | Hasegawa et al. | |
| 5,469,414 A | 11/1995 | Okamura | |
| 6,441,988 B2 * | 8/2002 | Kang et al. | 360/78.07 |
| 6,597,529 B1 * | 7/2003 | DeRosa | 360/78.04 |
| 6,744,590 B2 * | 6/2004 | Chu et al. | 360/78.07 |
| 6,850,386 B2 * | 2/2005 | Kovinskaya et al. | 360/78.07 |
| 6,873,490 B2 * | 3/2005 | Guo et al. | 360/78.07 |
| 6,937,431 B2 * | 8/2005 | Galloway | 360/78.06 |
| 7,208,898 B2 * | 4/2007 | Stoecker et al. | 360/78.06 |
| 7,636,605 B2 * | 12/2009 | Takakura | 360/78.07 |

FOREIGN PATENT DOCUMENTS

| | | |
|---|---|---|
| JP | 2004-348951 | 12/2004 |
| KR | 1993-9998 | 10/1993 |
| KR | 1996-13213 | 10/1996 |

OTHER PUBLICATIONS

IEEE Transactions on Magnetics, vol. 32, No. 3, "Vibration Minimized Access Control for Disk Drives" Mizoshita, et al; 1996.
Korean Office Action for 10-2008-0104149 mailed Dec. 21, 2009.

* cited by examiner

*Primary Examiner* — Hoa T Nguyen
*Assistant Examiner* — James L Habermehl
(74) *Attorney, Agent, or Firm* — Turocy & Watson, LLP

(57) ABSTRACT

There is provided a method for generating acceleration data used in feed-forward control of head seeking, wherein, a seek distance and one of a seek period and the count of samples are received; a weighting factor for the change rate of acceleration between adjacent sample times is determined respectively; and an optimum acceleration at each sample time is obtained by performing an optimization calculation that minimizes an objective function under a constraint condition based on variables representing accelerations at each sample time, either the seek period or the count of samples, and the seek distance.

6 Claims, 9 Drawing Sheets

SEEK CONTROL APPARATUS AND METHOD FOR GENERATING CONTROL DATA FOR SEEK CONTROL

CROSS REFERENCE TO RELATED APPLICATIONS

This application is based upon and claims the benefit of priority from the prior Japanese Patent Applications No. 2007-278383, filed on Oct. 26, 2007; the entire contents of which are incorporated herein by reference.

BACKGROUND OF THE INVENTION

1. Field of the Invention

The present invention relates to a seek control apparatus which performs seek control of a magnetic disk drive and a method for generating control data for seek control.

2. Related Art

Seeking a relatively small number of tracks of a magnetic disk with respect to the total servo tracks is generally called short seek.

To control short seeks, a conventional two-degree-of-freedom control system which uses a positioning feedback controller and a feed-forward controller is often used because the system readily reduces seek period which is a time period to required to seek.

In a short seek control system of a real-world magnetic disk drive, an acceleration input value for feed-forward control and a position trajectory (target trajectory) followed when the acceleration input value is input in a voice coil motor (VCM) plant model (Formula E, which will be described later) are calculated off-line beforehand and the calculated acceleration input value and target trajectory are stored as a numerical table in memory of a microprocessor which executes the short seek control system.

During seek control, a feed-forward control system can be implemented by referring to values in the table at each sample time. Deadbeat control (bang-bang control) is generally used in the feed-forward input (acceleration input). The plant model of the VCM used for calculating beforehand the values in the table for the feed-forward control system described above consists of the product of a second-order integral and a model gain.

Different magnetic disk drives, which are mass-produced, have different VCM gains. In addition, since the feed-forward control system is configured on the basis of a simplified model of a voice coil motor in which many mechanical resonances are inherently present, there are modeling errors. VCM gain variations and modeling errors degrade seek response during seek control and frequently cause write errors during settling (the sample time at the end of the seek control). In order to reduce seek period, it is desirable that the number of traversed tracks to which the short seek control system is applied be increased. However, as the traversed distance increases, more errors are caused by modeling errors and seek response degradation by excitation of mechanical resonance of the arm that supports the head becomes more serious.

SUMMARY OF THE INVENTION

According to an aspect of the present invention, there is provided with a seek control apparatus comprising:

a head seek controller configured to move a head for recording and reproducing of information to a target track on a disk on which information can be recorded;

a position detecting unit configured to detect a position of the head;

a first storage configured to store target trajectory data holding target positions of the head associated with each sample time, for each of a plurality of seek distances;

a second storage configured to store acceleration data holding accelerations to be applied to the head associated with each sample time, for each of the seek distances;

a detecting unit configured to detect occurrence of a seek request to a target track;

a counting unit configured to count a sample time every a constant time is elapsed from the occurrence of the seek request;

an error detecting unit configured to obtain a target position of the head associated with the counted sample time by referring to the target trajectory data corresponding to a target seek distance which is a seek distance to the target track and detect an error between an obtained target position and the head position at the counted sample time;

a feedback controller configured to calculate a position control command based on a detected error;

an acceleration calculating unit configured to obtain an acceleration associated with the counted sample time by referring to the acceleration data corresponding to the target seek distance and add an obtained acceleration to the position control command to generate a corrected position control command; and a commanding unit configured to provide the corrected position control command to the head seek controller;

wherein a graph obtained by plotting the acceleration data corresponding to each of the plurality of seek distances in a coordinate system formed by an acceleration axis and a time axis passing through an acceleration of 0 on the acceleration axis intersects the time axis at a time before an intermediate time between a start point and an end point of the graph.

According to an aspect of the present invention, there is provided with a method for generating acceleration data used in feed-forward control of head seeking, comprising:

receiving a seek distance for which the acceleration data is generated;

receiving a seek period in which a seek over the seek distance is to be performed or a count of samples corresponding to the seek period;

determining a weighting factor for a change rate of an acceleration between each adjacent sample times, respectively and calculating an optimum acceleration to be added to a head at each sample time, respectively, by minimizing an objective function which defines a weighting sum of squares of the change rates of accelerations between each adjacent sample times by each weighting factor, under a constraint condition based on variables representing accelerations to be added at each sample time, either the seek period or the count of samples, and the seek distance.

According to an aspect of the present invention, there is provided with a method for generating acceleration data used in feed-forward control of head seeking, comprising:

receiving a seek distance "r" for which the acceleration data is generated;

receiving a seek period in which a seek over the seek distance "r" is to be performed or a count of samples "N" corresponding to the seek period; and calculating an acceleration "f" to be added to a head at each sample time respectively by solving an LMI (Linear Matrix Inequality) represented by $$\begin{bmatrix} P_{11} & P_{12} & A_\infty P_{11} + B_\infty C_f P_{12}^T & A_\infty P_{12} + B_\infty C_f P_{22} & B_\infty f_2 & 0 \\ (*)' & P_{22} & A_f P_{12}^T & A_f P_{22} & f_1 & 0 \\ (*)' & (*)' & P_{11} & P_{12} & 0 & P_{11} C_\infty^T + P_{12} C_f^T D_\infty^T \\ (*)' & (*)' & (*)' & P_{22} & 0 & P_{12}^T C_\infty^T + P_{22} C_f^T D_\infty^T \\ (*)' & (*)' & (*)' & (*)' & I & f_2^T D_\infty^T \\ (*)' & (*)' & (*)' & (*)' & (*)' & \mu I \end{bmatrix} > 0$$

$$\begin{bmatrix} W & C_f V P_{12}^T & C_f V P_{22} \\ (*)' & P_{11} & P_{12} \\ (*)' & (*)' & P_{22} \end{bmatrix} > 0, \ \mathrm{trace}(W) < \rho$$

$$\begin{bmatrix} \sigma & f^T \\ f & (H^T H)^{-1} \end{bmatrix} > 0, \ \begin{cases} A_{eq} f - B_{eq} + [\varepsilon \ \varepsilon]^T > 0 \\ A_{eq} f - B_{eq} - [\varepsilon \ \varepsilon]^T < 0 \end{cases}$$

$$\begin{bmatrix} \delta & f^T \\ f & I \end{bmatrix} > 0$$

so that an objective function $J:=w_\infty + w_2 + w_J$ is minimized; where $$\begin{bmatrix} P_{11} & P_{12} \\ P_{12}^T & P_{22} \end{bmatrix} = P = P^T > 0, \ f = \begin{bmatrix} f_1 \\ f_2 \end{bmatrix},$$

$$f_1 = \begin{bmatrix} u[N-1] \\ u[N-2] \\ \vdots \\ u[2] \\ u[1] \end{bmatrix}, \ f_2 = u[0]$$

and

"N" is the count of the samples, "u[k]" is an acceleration at the sample time "k", and "$\varepsilon$" and "$\delta$" are arbitrary positive constants, and matrix coefficients are defined as $$A_f = \begin{bmatrix} 0 & \cdots & \cdots & \cdots & \cdots & 0 \\ 1 & 0 & & & & \vdots \\ 0 & 1 & 0 & & & \vdots \\ \vdots & \ddots & \ddots & \ddots & & \vdots \\ \vdots & & \ddots & \ddots & \ddots & \vdots \\ 0 & \cdots & \cdots & 0 & 1 & 0 \end{bmatrix}, \ C_f = [0 \ 0 \ \cdots \ 0 \ 1]$$

$$V = -K_g \cdot \frac{\tau^2}{2} \cdot \begin{bmatrix} 1 & 0 & \cdots & \cdots & \cdots & \cdots & 0 \\ 3 & 1 & 0 & & & & \vdots \\ 5 & 3 & 1 & 0 & & & \vdots \\ \vdots & & & \ddots & \ddots & & \vdots \\ \vdots & & & & & 1 & 0 & \vdots \\ 2N-1 & & & & & 3 & 1 & 0 \\ 2N-3 & 2N-1 & \cdots & \cdots & 5 & 3 & 1 \end{bmatrix}$$

$$A_{eq} = K_g \cdot \frac{\tau^2}{2} \cdot \begin{bmatrix} 2N-3 & 2N-1 & \cdots & 5 & 3 & 1 \\ 1 & 1 & \cdots & 1 & 1 & 1 \end{bmatrix},$$

$$B_{eq} = \begin{bmatrix} r \\ 0 \end{bmatrix}$$

where "$\tau$" is sample time, "r" is a seek distance, "Kg" is a gain of a discrete second-order integral $$P_m(z) = \{A_m, B_m, C_m, 0\}$$

$$A_m \begin{bmatrix} 1 & \tau \\ 0 & 1 \end{bmatrix}, \ B_m = \begin{bmatrix} K_g \cdot \frac{\tau^2}{2} \\ K_g \cdot \tau \end{bmatrix}, \ C_m = [1 \ 0]$$

which is a plant model of a head seek controller, and "A∞", "B∞", "C∞", and "D∞" are defined by an arbitrary transfer function $$W_\infty(z) = \{A_\infty, B_\infty, C_\infty, D_\infty\},$$

and $$H = \begin{bmatrix} 1 & 0 & 0 & 0 & 0 \\ -1 & 1 & 0 & \cdots & 0 \\ 0 & -1 & 1 & \cdots & 0 \\ \vdots & \ddots & \ddots & \ddots & \vdots \\ 0 & \cdots & 0 & -1 & 1 \\ 0 & \cdots & \cdots & 0 & 1 \end{bmatrix}$$

where "$w_\infty$", "$w_2$", and "$w_j$" are arbitrary positive constants.

DETAILED DESCRIPTION OF THE INVENTION

Embodiments of the present invention will be described with reference to the accompanying drawings.

Figure 6:
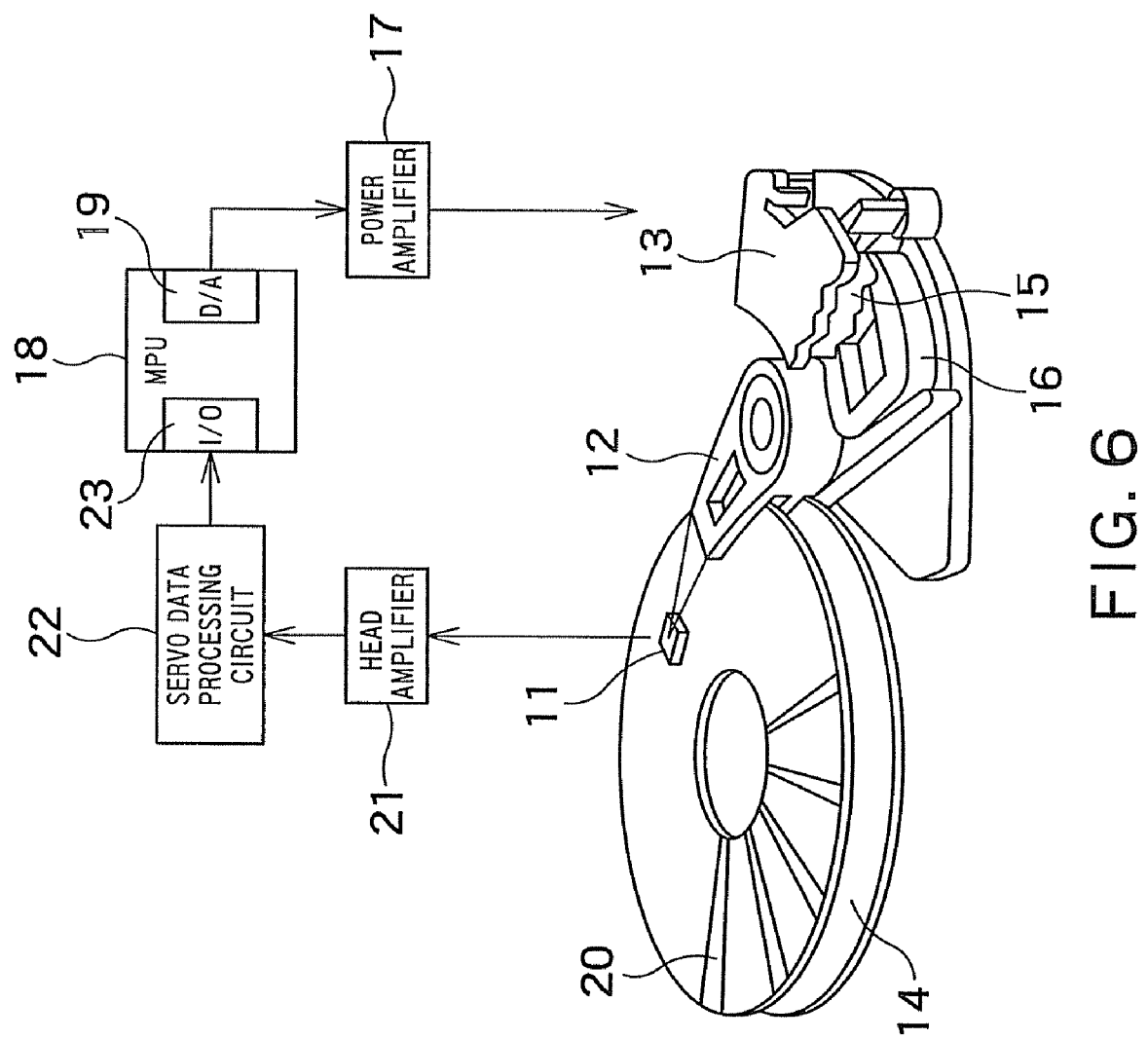
FIG. 6 is a diagram showing a positioning control system of a magnetic disk drive.

FIG. 6 schematically shows a configuration of a head positioning control system according to an embodiment of the present invention. The head positioning control system includes as a main component a microprocessor unit (MPU) 18 provided in a magnetic disk drive.

A head 11 is supported by an arm 12. The arm 12 is driven by a voice coil motor (VCM) 13 to cause the head 11 to move in the direction of the radius of a magnetic disk 14 on which information can be magnetically recorded. The arm 12 and the VCM 13 represent one example of a head seek controller which moves the head 11 to a target track.

The VCM 13 includes a magnet 15 and driving coil 16 and is driven by a current provided from a power amplifier 17.

The MPU 18 causes a D/A converter 19 to convert a control command obtained by calculation to an analog signal and provides the analog signal to a power amplifier 17.

The power amplifier 17 converts the control command provided by the MPU 18 to a driving current and provides the driving current to the VCM 13.

One or more disks 14 are provided and are rotated at a high speed by a spindle motor (not shown). Multiple tracks are provided concentrically on the disk and servo areas (servo sectors) 20 are provided on each track at regular intervals. Track position information is embedded in the servo areas 20 beforehand. The head 11 traverses the servo areas 20 to thereby cause the position information to be read from the head 11. A signal representing the read position information is amplified by a head amplifier 21 and the amplified signal is provided to a servo data processing circuit 22.

The servo data processing circuit 22 generates servo information from the amplified signal and outputs the servo information to the MPU 18 at a constant time interval.

The MPU 18 calculates the position of the head from the servo information received at an I/O 23 and calculates a control command to be provided to the VCM 13 from the calculated head position and a target head position (target position) at a constant time interval. The MPU 18 has a position detecting unit which detects the position of the head.

Figure 1:
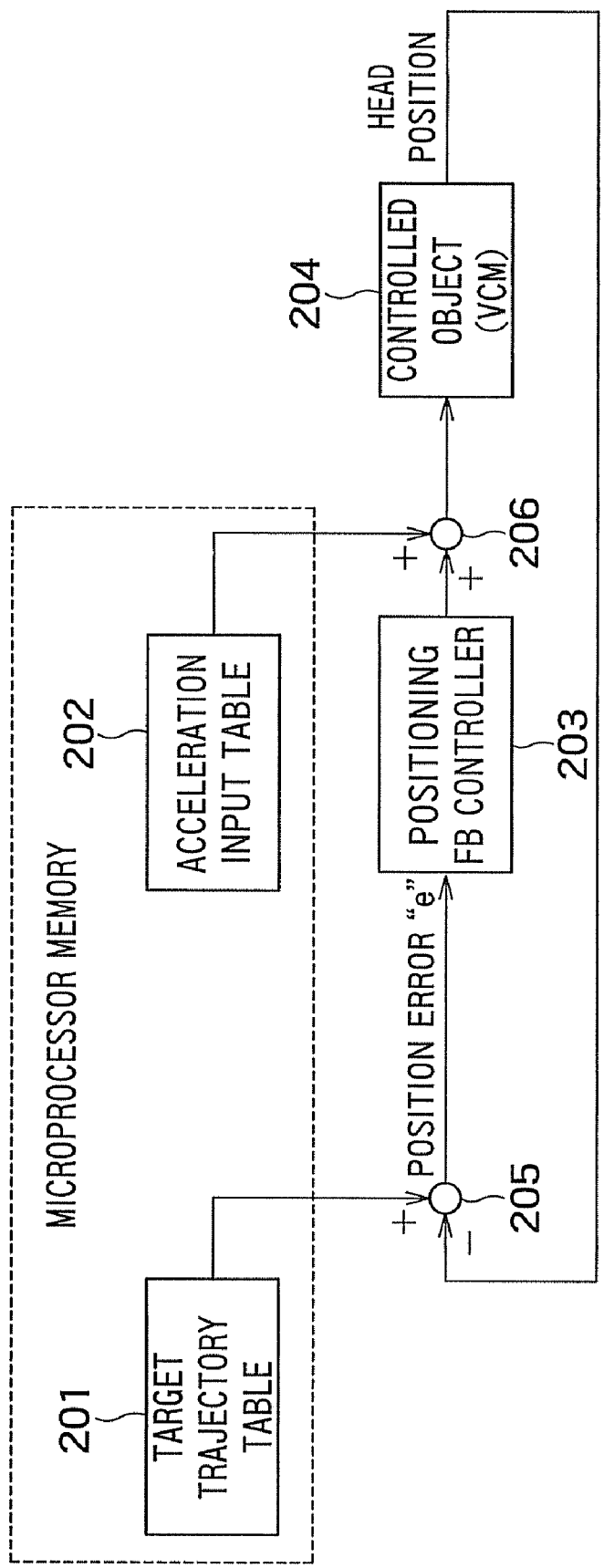
FIG. 1 is a diagram showing a configuration of a seek control apparatus (short seek control system) as one embodiment of the present invention.

FIG. 1 shows a configuration of a short seek control system in a magnetic disk drive. The short seek control system can be implemented as software in the MPU 18, for example, except for a controlled object 204.

The short seek control system is driven by a digital control system with sample time "τ".

Target trajectory data specifying target positions for each sample time that is used in a seek from a seek start track to a target track is stored in a target trajectory table 201. The target positions, for example, may be relative positions from the seek start track. The target trajectory table 201 stores the target trajectory data for each of a plurality of seek distances (the distance from a seek start track to a target track). That is, the target trajectory data hold target positions of the head associated with each sample time, for each of a plurality of seek distances.

Acceleration data specifying acceleration inputs to be applied to the head in each sample time during the seek is stored in an acceleration input table 202. The acceleration input table 202 stores the acceleration data for each seek distance. That is, the acceleration data holds accelerations to be applied to the head associated with each sample time, for each of the seek distances.

The target trajectory table 201 and the acceleration input table 202 are provided beforehand as tables in a memory (first and second storages) of the MPU (microprocessor) 18 which executes the digital control system. The MPU 18 detects occurrence of a seek request to a target track, calculates a seek distance (target seek distance) to the target track at a time of detecting the occurrence of the seek request is detected, and sends the calculated seek distance to the error calculating unit 205 and adding unit 206 as will be described subsequently via the memory or directly.

Transfer characteristics of transfer from the VCM 13 to head positions are represented as the controlled object 204.

An error calculating unit (error detecting unit) 205 receives a signal indicating an actual head position in the controlled object 204 in every sample time and refers to target trajectory data corresponding to the seek distance to obtain a target position in every sample time. That is, the error calculating unit 205 perform counting of a sample time every a constant time is elapsed (i.e. every the head position signal is received) after a detection of the seek start, and reads the target position associated with the counted sample time from the target trajectory data corresponding to the seek distance. The error calculating unit 205 receives the seek distance (target seek distance) from the MPU 18 while receive a seek start signal, from the MPU 18 via the memory or directly, and refers to the target trajectory data corresponding to the received seek distance. The error calculating unit 205 generates a position error signal representing an error between an actual head position and a target position and inputs the generated position error signal to a positioning feedback controller (positioning FB controller) 203. The positioning feedback controller 203 includes a feedback controller and a commanding unit, for example.

The positioning feedback controller 203 generates a position control command from a position error signal input from the error calculating unit 205 and outputs the position control command to an adding unit 206.

The adding unit (acceleration adding unit) 206 receives a position control command from the positioning feedback controller 203 in every sample time while obtaining an acceleration input by referring to acceleration data corresponding to the seek distance in every sample time. That is, the adding unit 206 perform counting of a sample time every the constant time is elapsed (i.e. every the position control command is received) from a detection of the seek start, and reads the acceleration input associated with the counted sample time from the acceleration data corresponding to the seek distance.

The adding unit 206 receives the seek distance (target seek distance) from the MPU 18 while receive the seek start signal, from the MPU 18 via the memory or directly, and refers to the acceleration data corresponding to the received seek distance. The adding unit 206 adds the acceleration input to the position control command and outputs the sum (corrected position control command) to the controlled object 204.

The two-degree-of-freedom control system in the short seek control system descried above corrects an error between a target trajectory and an actual head position by feedback control. Therefore, if there is a modeling error, the head is eventually settled at the target track.

However, since the short seek control seeks to the target track in a very short time in the order of several to several tens of samples, the head typically reaches the target track before the correction by the feedback controller converges.

Accordingly, large modeling errors can degrade seek response during settling (sample time at the end of seek control). As a result, write errors frequently occur and it takes a long time until write permission is granted, degrading the performance of the magnetic disk drive.

The present embodiment is characterized in that an acceleration input and a target trajectory are used that slow the response during settling so that the head smoothly moves to a target track. The present invention is also characterized by a method for calculating such an acceleration input (and target trajectory). In order to obtain an acceleration input that slows the response during settling so that the head smoothly moves to a target track, the acceleration during settling may be relatively reduced from the acceleration input during the entire seek and the speed of the head during the settling may be decreased.

Furthermore, in order to prevent excitation of mechanical resonance of the head, an acceleration input as smooth as possible should be chosen. In order to obtain such an acceleration input, an optimization calculation that minimizes the sum of squares of the change rate of acceleration (jerk) can be used. Examples of documents that describe a seek control method that focuses attention on reducing the jerk includes JP-A 2004-348951 (Kokai).

A method for obtaining an acceleration input that takes into consideration the conditions described above will be described below as a first embodiment of the present invention.

Formula A given below is used as a minimization objective function, Formula B is used as a constraint condition, and optimization is performed so that the Formula A is minimized under the constraint condition of Formula B, thereby obtaining a desired acceleration input (optimum acceleration). That is, a constrained least-square method is used to obtain a desired acceleration input.

$$J = (QCU)^T (QCU) \quad \text{[Formula A]}$$

$$\sum_{k=0}^{N-1} ku[N-1-k] = const \quad \text{[Formula B]}$$

$$\sum_{k=0}^{n} u[k] = 0$$

where "N" represents the number (count) of samples between the start of seek control and the end of the seek control and "u[k]" represents an acceleration input at a sample time "k". "U", "C", and "Q" are expressed by Formula C given below and denote a vector in which inputs u[k] at sample times in seek control are arranged, a difference matrix, and a weighting factor matrix, respectively.

$$U = [u[0], u[1], \ldots, u[N-1]]^T, \quad \text{[Formula C]}$$

$$C = \begin{bmatrix} 1 & 0 & 0 & 0 & 0 \\ -1 & 1 & 0 & \ldots & 0 \\ 0 & -1 & 1 & \ldots & 0 \\ \vdots & \ddots & \ddots & \ddots & \vdots \\ 0 & \ldots & 0 & -1 & 1 \\ 0 & \ldots & \ldots & 0 & 1 \end{bmatrix},$$

$$Q = \begin{bmatrix} \sqrt{q_0} & & & & \\ & \sqrt{q_1} & & & \\ & & \ddots & & \\ & & & \ddots & \\ & & & & \sqrt{q_{N-1}} \end{bmatrix}$$

Formula A represents a weighted sum of squares of the change rate of acceleration (jerk) over all samples in seek control, which is apparent from the definitions of "U", "C", and "Q". For example, substitution of "U", "C", and "Q" into Formula A yields $$J = q_0 * u[0]^2 + q_1 * (u[1] - u[0])^2 + q_2 * (u[2] - u[1])^2 + \ldots + q_{N-1} * u[N-1]^2$$

Formula B represents a constraint condition derived from conditions required of a feed-forward input in seek control. To obtain the constraint condition, first a plant model of the VCM is represented as a discrete-system state-space representation by Formula E:

$$x[i+1] = Ax[i] + Bu[i] = \begin{bmatrix} 1 & \tau \\ 0 & 1 \end{bmatrix} x[i] + \begin{bmatrix} \tau^2/2 \\ \tau \end{bmatrix} u[i] \quad \text{[Formula E]}$$

The conditions required of a feed-forward input are x[0]=0 in the initial state of a state variable and that x[N] reaches a position "r" and a speed of "0" at a sample time "N". Therefore, from a recurrence formula (Formula F) for solving the state variable x[i] of the discrete system $$x[i] = A^i x[0] + \sum_{k=0}^{i-1} A^k Bu[i-1-k] \quad \text{[Formula F]}$$

the seek end sample time N is substituted as $$\sum_{k=0}^{N-1} A^k Bu[i-1-k] = \begin{bmatrix} r \\ 0 \end{bmatrix} \quad \text{[Formula G]}$$

to derive the constraint condition (Formula B) given above. In Formula G, "r" (the distance to the target track) corresponds to "const" in Formula B.

A method for setting each weighting factor $\sqrt{q_k}$ in the weighting matrix Q in optimization calculation using Formulas A to C (Formula A is optimized under the constraint condition of Formula B to obtain an acceleration input vector U) will be described next.

First, a reference value of $\sqrt{q_k}$ is defined (which may normally be 1). For several samples from the start of seek control in the beginning, a value smaller than the reference value is chosen; for several samples before the end of the seek, a value greater than the reference value is chosen. To that end, Formula H or an increasing function similar to Formula H, for example, may be used.

Figure 2:
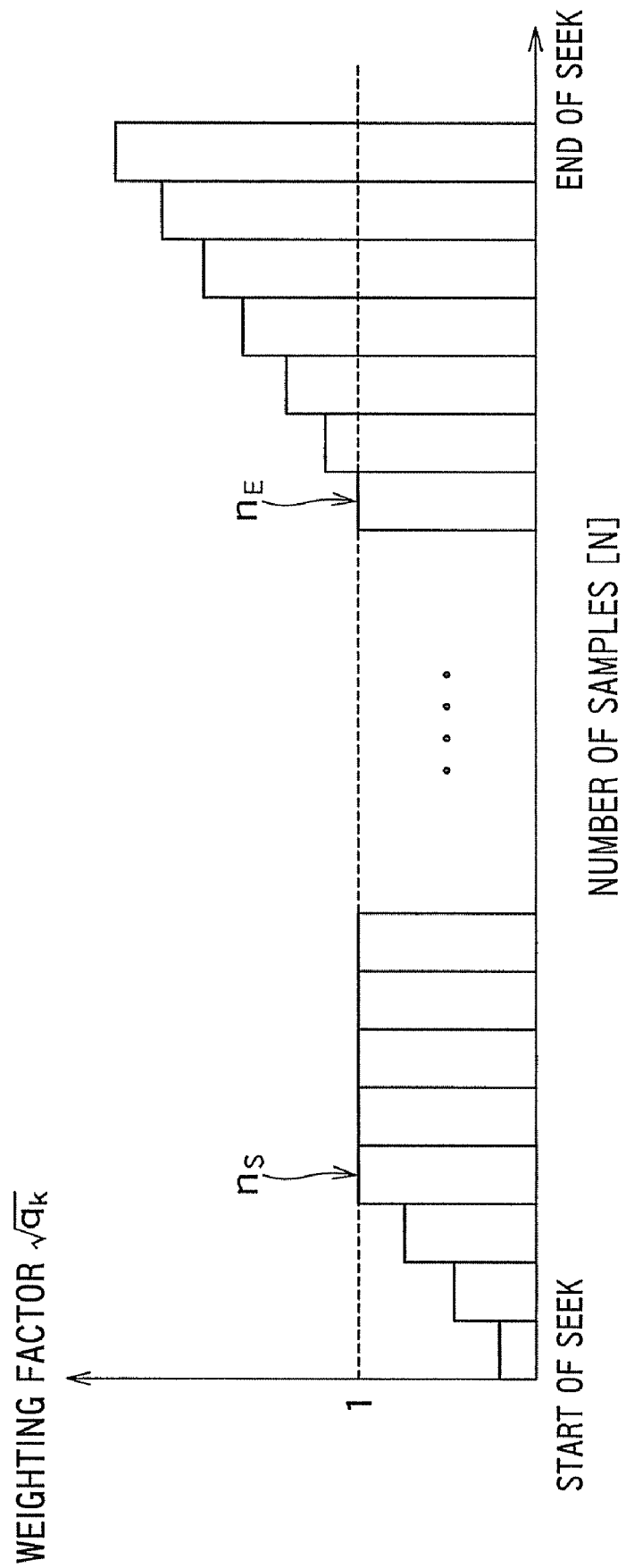
FIG. 2 is a diagram showing exemplary weighting factors calculated by using a first embodiment of the present invention.

When $0 \leq k < n_s$, $\sqrt{q_k} = 1 - \alpha \dfrac{n_s - k}{n_s}$ $(0 < \alpha < 1)$ [Formula H]

when $n_E < k \leq N - 1$, $\sqrt{q_k} = 1 + \beta \dfrac{n_E - k}{n_E - (N-1)}$ $(0 < \beta < 1)$ In Formula H, the reference value of $\sqrt{q_k}$ is defined as 1, "$n_s$" (a first threshold) represents the sample time at which $\sqrt{q_k}$ first set to 1, "$n_E$" (a second threshold) represents the sample time at which $\sqrt{q_k}$ is last set to 1 (at the instant immediately preceding the sample time at which the factor is set to a value greater than 1), and "$\alpha$" and "$\beta$" are constants representing the change rate of $\sqrt{q_k}$. Here, "$n_s$", "$n_E$", "$\alpha$" and "$\beta$" are design parameters. FIG. 2 shows an example in which Formula H is used to set weighting factors $\sqrt{q_k}$.

Setting the weighting factor $\sqrt{q_k}$ described above, an optimal solution (acceleration input vector "U") can be derived from the optimization calculation of Formulas A to C that allows for the change rate of acceleration in the beginning of seek control and reduces changes of the acceleration in the end of seek control.

As a result, a relatively large acceleration is input in the beginning of seek control and a relatively small value is input in the end of the seek control. Thus, an acceleration input and a target trajectory can be obtained (the target trajectory can be obtained by inputting the acceleration into a VCM plant model) that reduce the speed of the head during settling so that the head smoothly reaches the target track. In addition, since the acceleration input thus obtained is based on minimization calculation that minimizes the sum of squares of jerk, excitation of mechanical resonance is minimized.

By using the acceleration input thus obtained, short seek control can be achieved that reduces degradation of response during settling due to modeling errors and degradation of response due to excitation of mechanical resonance.

An example of performing short seek control will be described in which an acceleration input (and a target trajectory) is calculated according to the present invention, where the number N of seek samples is set to 28 and several tens of tracks are traversed. The calculation process described below can be implemented by causing a processor such as a CPU to execute a program including an instruction code that implements the present invention, for example.

First, the processor receives an input of a seek distance for generating acceleration data (first input receiving step) and also receives an input of seek period in which a seek over the seek distance is to be performed or the number of samples, which is the seek period divided by sample time (second input receiving step). It is assumed here that a seek distance of several tens of tracks and the number of samples, 28, have been input.

The processor determines a weighting factor for the change rate of acceleration between each adjacent sample times, respectively (determining step). That is, the processor determines a weighting factor $\sqrt{q_k}$. Here, it is assumed that the weighting factor is determined according to Formula H and the parameters "$n_s$", "$n_E$", "$\alpha$", and "$\beta$" in Formula H have been determined as given in Table 1.

TABLE 1

Parameters in Formula H for 28-sample short seek

| $n_s$ | $n_E$ | $\alpha$ | $\beta$ |
|---|---|---|---|
| 5 | 19 | 0.2 | 2.7 |

Then, the processor calculates an optimum acceleration at each sample time respectively by performing optimization calculation so as to minimize an objective function that defines that the sum of squares of the change rate of acceleration in the period between the adjacent sample times that are weighted by respective weighting factors is obtained, under a constraint condition based on variables representing the acceleration at each sample time and either the seek period or the number of samples, and the seek distance (optimizing step). Here, the optimum acceleration is obtained by performing the optimization calculation of Formulas A to C.

Figure 3:
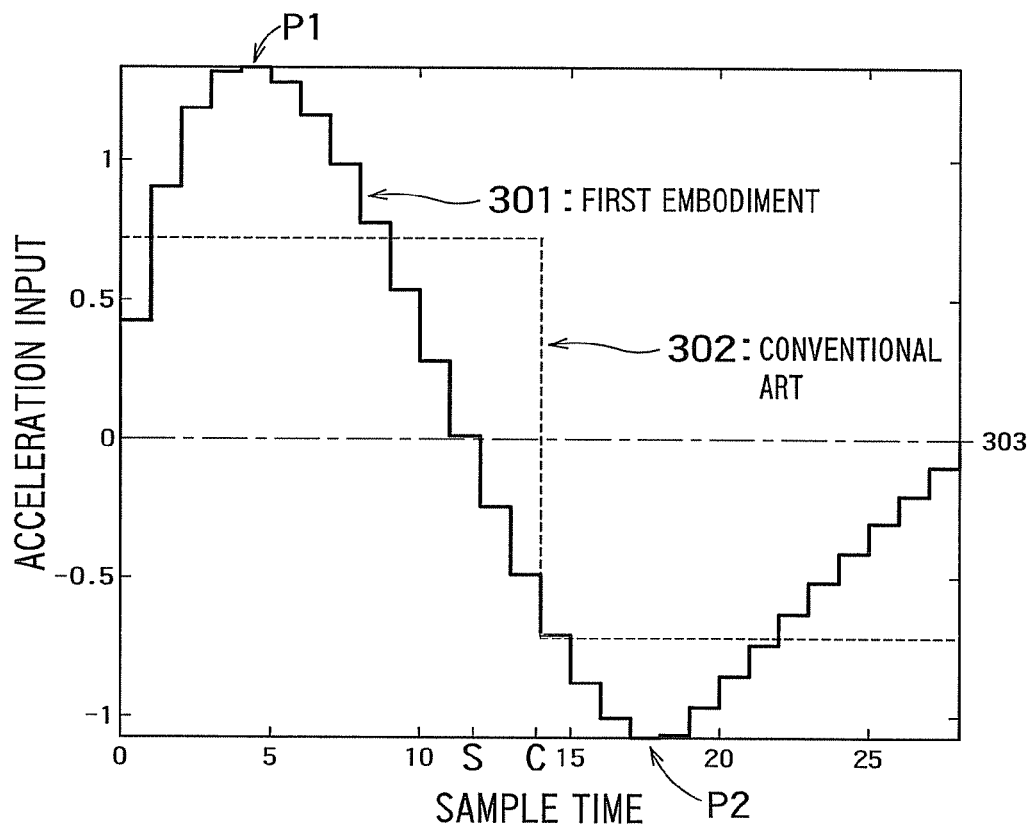
FIG. 3 is a diagram showing an acceleration input calculated by using the first embodiment of the present invention.
Figure 4:
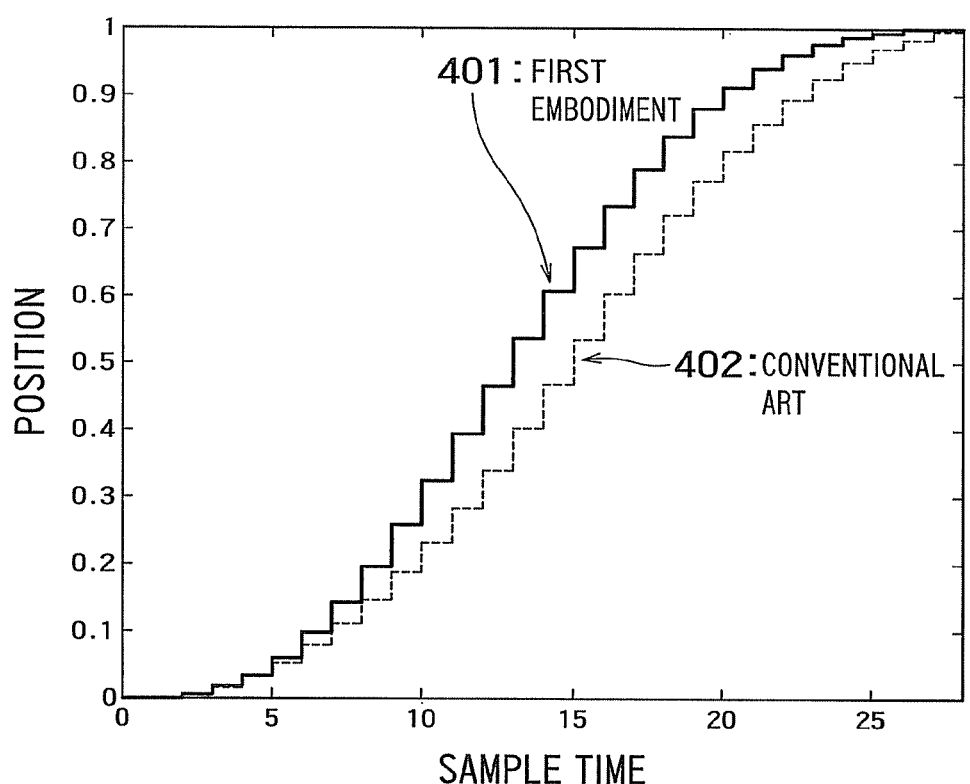
FIG. 4 is a diagram showing target trajectories calculated from the acceleration input in FIG. 3 and a VCM plant model.

FIG. 3 shows an acceleration input thus obtained. FIG. 4 shows a target trajectory obtained by inputting the acceleration input shown in FIG. 3 in a VCM plant model.

The solid line shown 301 in FIG. 3 is a graph representing the acceleration input obtained by carrying out the present invention. The solid line graph 301 can be obtained by plotting an acceleration input (acceleration data) in a coordinate system having an acceleration axis and a time axis 303 that passes an acceleration of 0 on the acceleration axis.

The dashed line 302 is a graph representing an acceleration input obtained under deadbeat control typically used in short seek control that is set so that the target track is reached in 28 samples, like the acceleration input according to the present invention.

The acceleration input according to the present invention has greater values at the start of the seek and smaller values at the end of the seek as intended. Since the acceleration input is based on minimization calculation of the sum of squares of jerk, the solid line 301 representing the acceleration input of the present invention has a smooth shape.

In particular, the solid line 301 (graph of the present invention) intersects the time axis 303 at time S before the intermediate time C between the start and end points of the solid line 301. The solid line 301 lies in the acceleration region in which the acceleration is greater than 0 before the intersection time S and in the deceleration region in which the acceleration is smaller than 0 after the intersection time S. The solid line graph 301 has main peaks P1 and P2, each in the acceleration and deceleration regions (that is, before and after the intersection time S). A graph having such a characteristic can be obtained by determining a weighting factor $\sqrt{q_k}$ by using the method described above. The dashed line graph 302 of the conventional art intersects the time axis 303 at intermediate time C and is point-symmetric about the intermediate time.

On the other hand, as shown in FIG. 4, the target trajectory calculated from the acceleration input (solid line graph 301) in FIG. 3, represented by a solid line 401, approaches the target track (1 in FIG. 4 because of normalization) more quickly than the target trajectory under typical deadbeat control (bang-bang control) represented by the dashed line 402. Thus, it can be seen that the speed of the head during settling is reduced.

Given below are results of an experiment in which effects of the present invention are verified by using a 2.5-inch magnetic disk drive (real drive).

Figure 5:
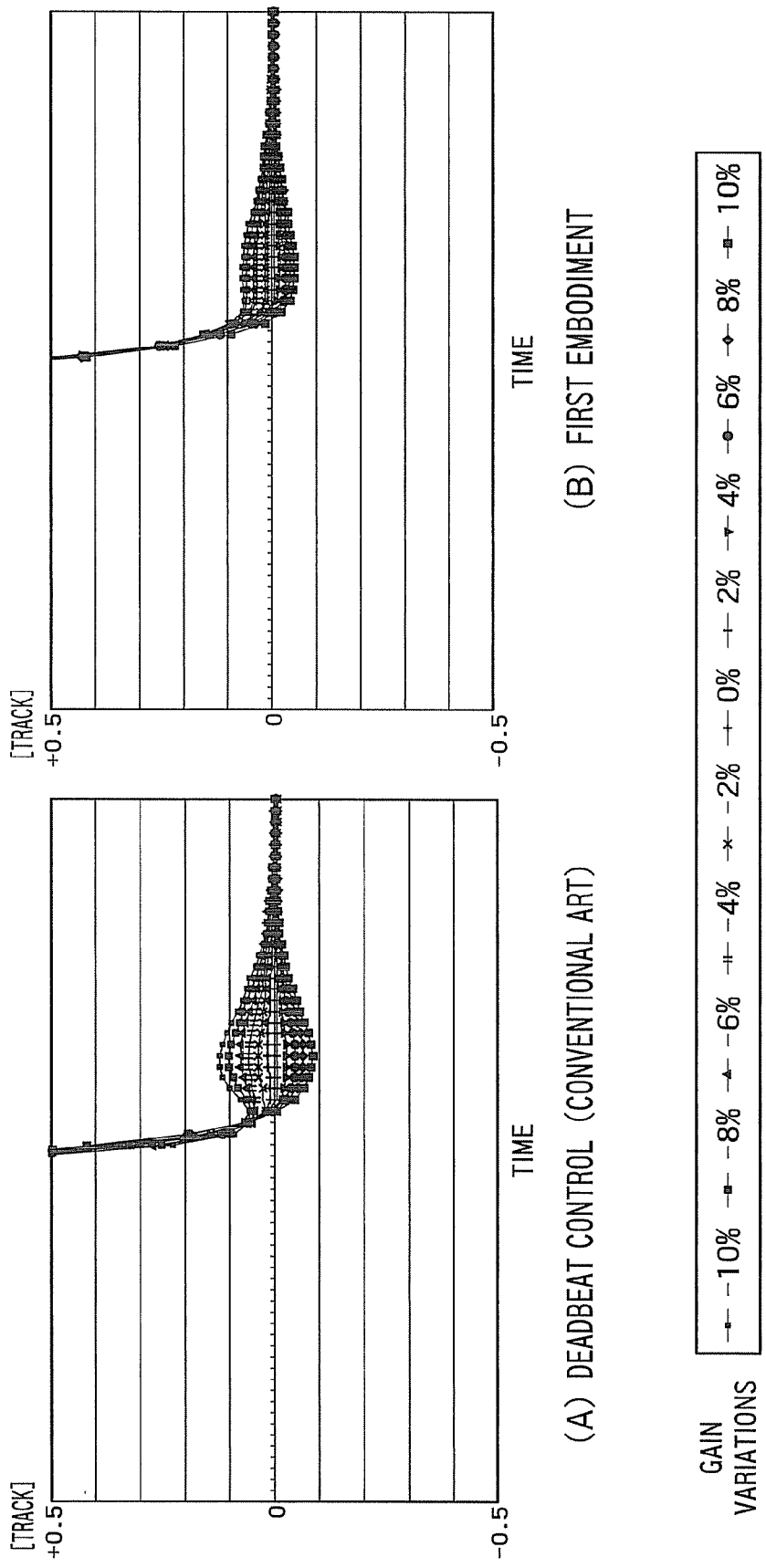
FIG. 5 is a diagram showing a comparison of variations in seek trajectory during settling between the present invention and a conventional art.

FIG. 5 shows average trajectories obtained by measuring responses during settling some times while varying a feedforward acceleration gain from a proper amount by 0 to +/−10%. The results represent an evaluation measure of the robustness to modeling errors due to variations in trajectory from drive to drive (real drives).

FIG. 5A shows the result of an experiment using the deadbeat control (conventional method) and FIG. 5B shows the result according to the present invention. The value 0 on the vertical axis represents the center of a target track. When the head enters a predetermined range from the center of the track, permission to write is granted. Accordingly, it is desirable that the seek trajectory during settling converge with as small a deviation as possible from the center of the track. The responses according to the present invention converge with small deviations from the center of the target track as compared with the responses according to the conventional deadbeat control. Thus, it has been verified that a robust seek control method with less variations in trajectory against variations in acceleration gain can be achieved.

A second embodiment of the present invention will be described below.

The acceleration input calculation method in the first embodiment is optimization calculation performed by adjusting a weight function to obtain a target trajectory that approaches a target track more quickly with a smooth acceleration input. In the second embodiment, on the other hand, an optimization method is shown in which an acceleration input is calculated so that the power spectrum of the acceleration input is directly reduced at a mechanical resonance frequency to further reduce excitation of resonance as compared with the first embodiment and prevent an excessive control input.

Like Formula C, an acceleration input vector to be obtained is defined first as $$U=[u[0], u[1], \ldots, u[N-1]]^T \quad \text{[Formula I]}$$

In the second embodiment, optimization calculation for obtaining the acceleration input is performed based on a transfer function of the system. The transfer function that outputs the acceleration input vector "U" defined by Formula I in response to an impulse input can be defined as $$F(z) = \frac{u[0]z^{N-1} + u[1]z^{N-2} + \ldots + u[N-2]z + u[N-1]}{z^{N-1}} \quad \text{[Formula J]}$$

Since the target trajectory (the position of the head in each sample time) can be generated by inputting the acceleration input vector "U" in a plant model, it is apparent that an impulse response of the system F(z)Pm(z) in which the transfer function F(z) in Formula J and a VCM plan model Pm(z) are connected in series will be the target trajectory $r_m[i]$.

Similarly, since the target track r[i] is a constant value, it will be the impulse response of the step function $$W_2(z) = \frac{r}{z-1} \quad \text{[Formula K]}$$

Figure 7:
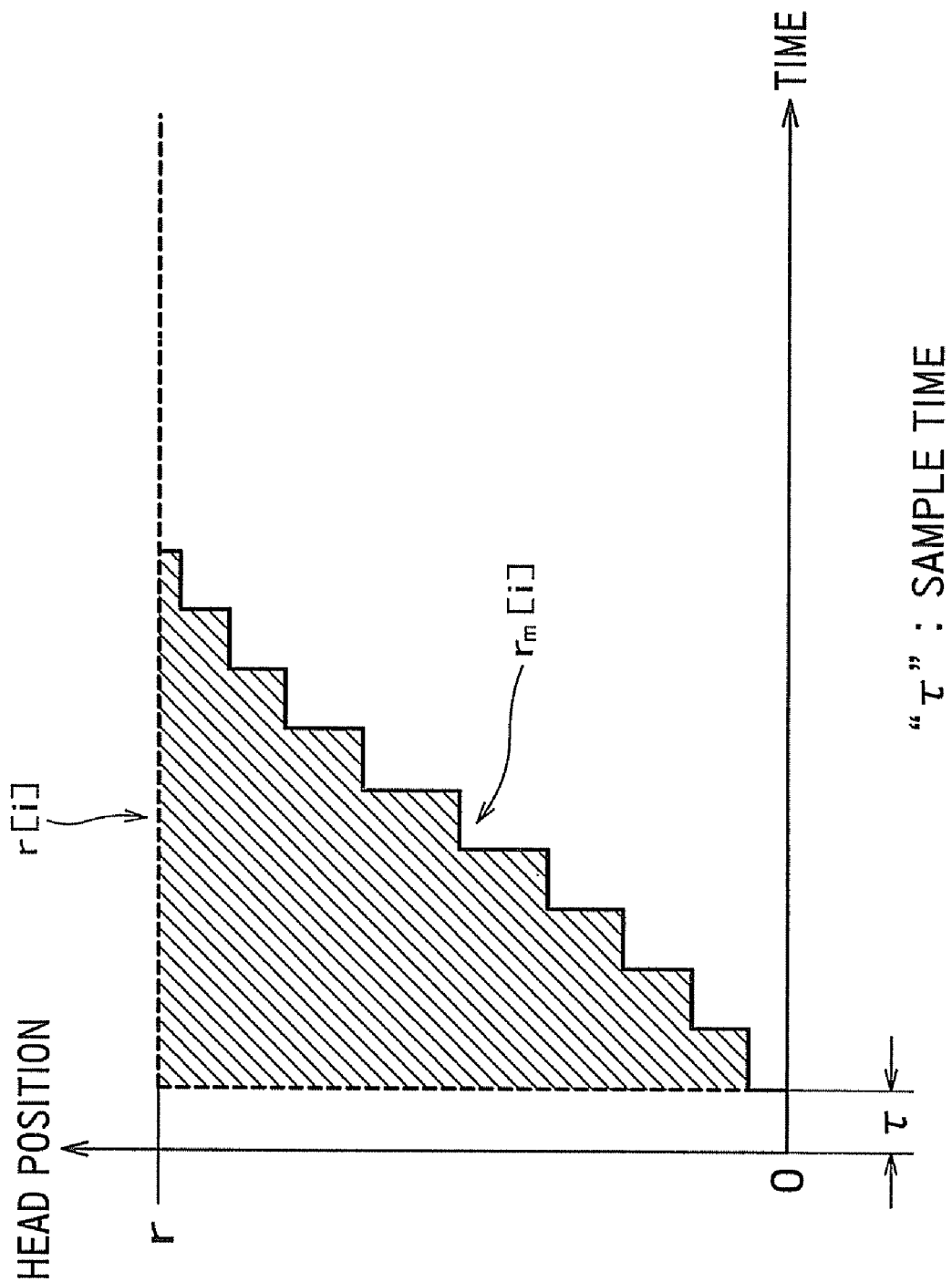
FIG. 7 is a diagram showing a difference between a target track and a target trajectory.

Here, it can be seen that, as shown in FIG. 7, if the area of the shaded portion calculated from the difference between the target track r[i] and the target trajectory $r_m[i]$ is smaller, the target trajectory that approaches the target track more quickly can be obtained. The area of the shaded portion in FIG. 7 can be defined by the H2 norm of the following transfer function (Formula L) that represents the difference between the target track r[i] and the target trajectory $r_m[i]$.

$$W_2(z) - F(z)P_m(z) \quad \text{[Formula L]}$$

Figure 8:
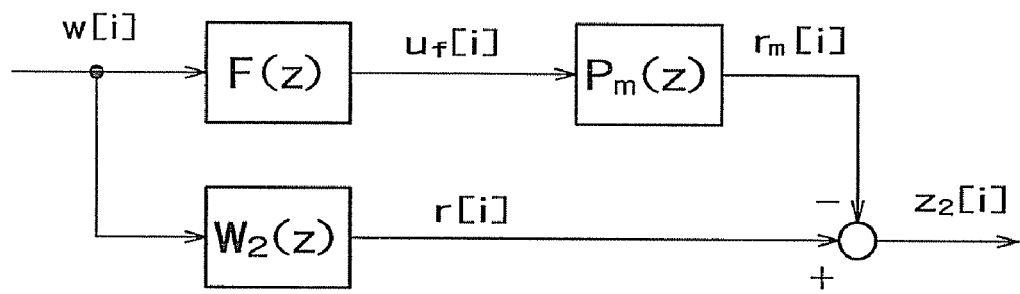
FIG. 8 is a diagram showing a system for evaluating a H2 norm.

FIG. 8 shows a block diagram of Formula L. In FIG. 8, w[i] represents an impulse input and $z_2[i]$ is an output for evaluating the H2 norm. Therefore, by solving an optimization problem that minimizes the H2 norm from w[i] to $z_2[i]$, the area of the shaded portion of FIG. 7 can be minimized and a target trajectory (acceleration input vector U) that approaches the target track more quickly can be obtained. Obtaining the acceleration input vector "U" by minimizing the H2 norm has an effect similar to that of the acceleration input calculation method in the first embodiment.

Achieving a more precise seek by further reducing excitation of mechanical resonances in a controlled object to a lower level than that in the first example will be considered next. If an acceleration input excites a mechanical resonance in an arm and suspension to be controlled, seek responses become oscillatory and settling is impaired. In the first embodiment, the effect of reducing mechanical resonances can be provided by minimizing the sum of squares of jerk. In order to achieve a more precise seek, it is desirable to reduce the power spectrum of an acceleration input vector "U" locally at a mechanical resonance frequency.

Here, the power spectrum $P(\omega)$ of the acceleration input vector "U" at a frequency $\omega$ is defined by $$P(\omega) = \frac{\tau}{N} \left| \sum_{n=0}^{N-1} u[n] \cdot e^{-jn\omega\tau} \right|^2 \quad \text{[Formula M]}$$

where "$\tau$" is a sample time. The frequency response of the transfer function F(z) of Formula J can be obtained by substituting $$z = e^{j\omega\tau} \quad \text{[Formula N]}$$

into F(z). Substitution of Formula N into Formula J yields $$u[0] + u[1]e^{-j\omega\tau} + \ldots + u[N-1]e^{-j\omega\tau(N-1)} \quad \text{[Formula O]}$$

Since Formula O is equal to the absolute value section in Formula M, the frequency response of F(z) directly reflects the power spectrum of the acceleration input vector U. Therefore, the acceleration input vector "U" whose power spectrum at an arbitrary frequency $\omega$ is reduced can be obtained by frequency-shaping of F(z) using a frequency weight transfer function. The frequency shaping can be defined as a minimization problem of the H∞ norm of the system.

Figure 9:
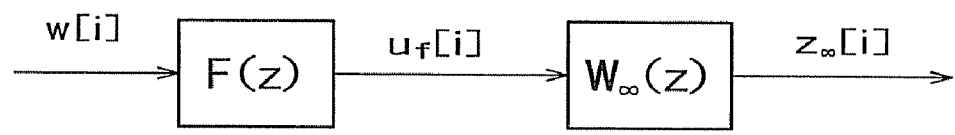
FIG. 9 is a diagram showing a system for evaluating a H∞ norm.

FIG. 9 shows a system for evaluating the H∞ norm. The system in FIG. 9 evaluates inputs and outputs from an impulse input w[i] to an output $z_\infty[i]$ like the evaluation of the H2 norm described above. An acceleration input that has a more improved effect of reducing excitation of resonances than that in the first embodiment can be obtained by choosing a weight function $W_\infty(z)$ in the system in FIG. 9 in which the gain is set to a higher value at frequencies around the frequency at which a mechanical resonance of the arm and suspension occurs and solving a problem that minimizes the H∞ norm from w[i] to $z_\infty[i]$.

Figure 10:
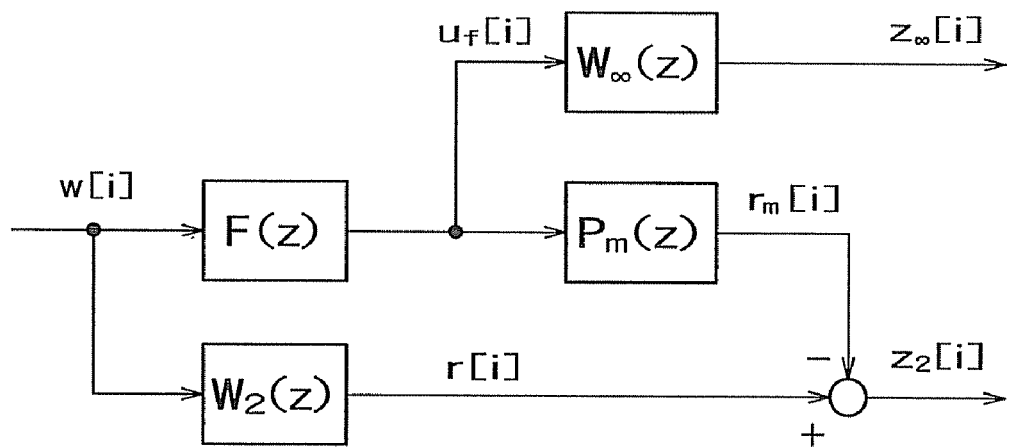
FIG. 10 is a diagram showing a system for evaluating H2 and H∞ norms at the same time.

By performing evaluations of the H2 norm and H∞ norm described above at the same time, the target track can be approached quickly and an acceleration input vector "U" whose power spectrum at a mechanical resonance is reduced can be obtained. FIG. 10 shows an evaluation system for solving the simultaneous optimization problem. The system in FIG. 10 is the combination of the system for evaluating the H2 norm shown in FIG. 8 and the system for evaluating the H∞ norm shown in FIG. 9. The combined system is capable of obtaining a desired acceleration input vector "U" by minimizing the H∞ norm from w[i] to $z_\infty[i]$ and the H2 norm from w[i] to $z_2[i]$ simultaneously.

The H2/H∞-norm mixed evaluation problem mentioned above can be solved by a numerical optimization problem called Linear Matrix Inequality (LMI). The LMI will be described below.

The LMI can be formulated by a state equation expression of the system. First, the transfer function F(z) of Formula J is converted to a state space representation as follows:

$$F(z) = \{A_f, f_1, C_f, f_2\} \quad \text{[Formula P]}$$

$$A_f = \begin{bmatrix} 0 & \cdots & \cdots & & 0 \\ 1 & 0 & & & \\ 0 & 1 & 0 & & \\ \vdots & \ddots & \ddots & \ddots & \vdots \\ \vdots & & \ddots & \ddots & \vdots \\ 0 & \cdots & \cdots & 0 & 1 & 0 \end{bmatrix}, f_1 = \begin{bmatrix} u[N-1] \\ u[N-2] \\ \vdots \\ u[2] \\ u[1] \end{bmatrix},$$

$$C_f = [0\ 0\ \cdots\ 0\ 1], f_2 = u[0]$$

where $F(z) = \{A_f, f_1, C_f, f_2\}$ is a simplified expression of the state equation of the system $$x[i+1] = A_f x[i] + f_1 u[i]$$

$$y[i] = C_f x[i] + f_2 u[i]$$

Expressions similar to this will be used to write state equations in the following description.

A plant model Pm(z) is represented by a second-order integral of gain Kg and sample time τ as follows:

$$P_m(z) = \{A_m, B_m, C_m, 0\} \quad \text{[Formula Q]}$$

$$A_m = \begin{bmatrix} 1 & \tau \\ 0 & 1 \end{bmatrix}, B_m = \begin{bmatrix} K_g \cdot \tau^2/2 \\ K_g \cdot \tau \end{bmatrix}, C_m = [1\ 0],$$

then the state space representing inputs and outputs from w[i] to $z_2[i]$ for evaluating the H2 norm in FIG. 10 can be written as $$G_2(z) = \{A_f, f_1, C_f V, f_2\}, \quad \text{[Formula R]}$$

$$V = -K_g \cdot \frac{\tau^2}{2} \cdot \begin{bmatrix} 1 & 0 & \cdots & \cdots & \cdots & 0 \\ 3 & 1 & 0 & & & \vdots \\ 5 & 3 & 1 & 0 & & \vdots \\ \vdots & & & \ddots & \ddots & \vdots \\ \vdots & & & & 1 & 0 & \vdots \\ 2N-1 & & & & 3 & 1 & 0 \\ 2N-3 & 2N-1 & \cdots & \cdots & 5 & 3 & 1 \end{bmatrix}$$

If an arbitrary weight transfer function $W_\infty(z)$ is $$W_\infty(z) = \{A_\infty, B_\infty, C_\infty, D_\infty\} \quad \text{[Formula S]}$$

then the state space representing the inputs and outputs from w[i] to z∞[i] for evaluating the H∞ norm can be written as $$G_\infty(z) = \{\overline{A}_\infty, \overline{B}_\infty, \overline{C}_\infty, \overline{D}_\infty\} \quad \text{[Formula T]}$$

$$\overline{A}_\infty = \begin{bmatrix} A_\infty & B_\infty C_f \\ 0 & A_f \end{bmatrix}, \overline{B}_\infty = \begin{bmatrix} B_\infty f_2 \\ f_1 \end{bmatrix},$$

$$\overline{C}_\infty = [C_\infty\ D_\infty C_f], \overline{D}_\infty = D_\infty f_2$$

Therefore, Formulas R and T can be combined to obtain the state-space representation for performing H2/H∞ norm mixed evaluation as follows:

$$G_{\infty/2}(z) = \{A_{\infty/2}, B_{\infty/2}, C_{\infty/2}, D_{\infty/2}\} \quad \text{[Formula U]}$$

$$A_{\infty/2} = \begin{bmatrix} A_\infty & B_\infty C_f \\ 0 & A_f \end{bmatrix}, B_{\infty/2} = \begin{bmatrix} B_\infty f_2 \\ f_1 \end{bmatrix},$$

$$C_{\infty/2} = \begin{bmatrix} C_\infty & D_\infty C_f \\ 0 & C_f V \end{bmatrix}, D_{\infty/2} = \begin{bmatrix} D_\infty f_2 \\ 0 \end{bmatrix}$$

It is known that in a discrete system $$G(z) := \{A, B, C, D\} \quad \text{[Formula V]}$$

the following lemmas 1 and 2 hold.

[Lemma 1]

A necessary and sufficient condition for the H2 norm of G(z)

$$\|G(z)\|_2 \quad \text{[Formula W]}$$

to be $$\|G(z)\|_2^2 < \rho \quad \text{[Formula X]}$$

is that symmetric matrices X and W that satisfy LMI given below exist.

$$\begin{bmatrix} X & AX & B \\ (*)' & X & 0 \\ (*)' & (*)' & I \end{bmatrix} > 0, \begin{bmatrix} W & CX \\ (*)' & X \end{bmatrix} > 0 \quad \text{[Formula Y]}$$

$$\text{trace}(W) < \rho$$

(In the formula Y, (*)' represents the transpose of a symmetric element and trace (W) represents the sum of the diagonal elements of the symmetric matrix W.)

[Lemma 2]

A necessary and sufficient condition for the H∞ norm of G(z)

$$\|G(z)\|\infty \quad \text{[Formula Z]}$$

to be $$\|G(z)\|_\infty^2 < \mu \quad \text{[Formula A1]}$$

is that a symmetric matrix Y that satisfies the LMI given below exists.

$$\begin{bmatrix} Y & AY & B & 0 \\ (*)' & Y & 0 & YC^T \\ (*)' & (*)' & I & D^T \\ (*)' & (*)' & (*)' & \mu I \end{bmatrix} > 0 \quad \text{[Formula B1]}$$

Lemmas 1 and 2 are applied to the state space for evaluating the H2/H∞ norm mixed evaluation of Formula "U" to obtain the following LMI:

$$\begin{bmatrix} P_{11} & P_{12} & A_\infty P_{11}+B_\infty C_f P_{12}^T & A_\infty P_{12}+B_\infty C_f P_{22} & B_\infty f_2 & 0 \\ (*)' & P_{22} & A_f P_{12}^T & A_f P_{22} & f_1 & 0 \\ (*)' & (*)' & P_{11} & P_{12} & 0 & P_{11}C_\infty^T+P_{12}C_f^T D_\infty^T \\ (*)' & (*)' & (*)' & P_{22} & 0 & P_{12}^T C_\infty^T+P_{22}C_f^T D_\infty^T \\ (*)' & (*)' & (*)' & (*)' & I & f_2^T D_{\infty/2}^T \\ (*)' & (*)' & (*)' & (*)' & (*)' & \mu I \end{bmatrix} > 0 \qquad \text{[Formula C1]}$$

$$\begin{bmatrix} W & C_f V P_{12}^T & C_f V P_{22} \\ (*)' & P_{11} & P_{12} \\ (*)' & (*)' & P_{22} \end{bmatrix} > 0,\ \mathrm{trace}(W) < \rho$$

Here, the LMI variables are $$\begin{bmatrix} P_{11} & P_{12} \\ P_{12}^T & P_{22} \end{bmatrix} = P = P^T > 0,\ f = \begin{bmatrix} f_1 \\ f_2 \end{bmatrix} \qquad \text{[Formula D1]}$$

If solutions P and F of the LMI in Formula C1 are found, an acceleration input vector "U" that minimizes the H2 norm (for approaching the target track more quickly) and the H∞ norm (for reducing the power spectrum at a resonance frequency) at the same time is given by the solution "f" of Formula D1.

The jerk minimization problem described in the first embodiment is added to the LMI that minimizes the H2/H∞ norms of Formula C1 in order to evaluate the smoothness of the acceleration input. In order to bring the problem of minimizing the sum of squares of jerk into correspondence with Formula C1, the problem is formulated by an LMI to Formula E1 as follows:

$$\begin{bmatrix} \sigma & f^T \\ f & (H^T H)^{-1} \end{bmatrix} > 0 \qquad \text{\{Formula E1\}}$$

$$\begin{cases} A_{eq} f - B_{eq} + [\varepsilon\ \varepsilon]^T > 0 \\ A_{eq} f - B_{eq} - [\varepsilon\ \varepsilon]^T < 0 \end{cases}$$

Here, the matrix H in Formula E1 is equivalent to the difference matrix C in Formula C, and $A_{eq}$ and $B_{eq}$ are $$A_{eq} = K_g \cdot \frac{\tau^2}{2} \cdot \begin{bmatrix} 2N-3 & 2N-1 & \ldots & 5 & 3 & 1 \\ 1 & 1 & \ldots & 1 & 1 & 1 \end{bmatrix}, \qquad \text{[Formula F1]}$$

$$B_{eq} = \begin{bmatrix} r \\ 0 \end{bmatrix}$$

which are matrix representations of the equality constraint in Formula G. In Formula E1, "ϵ" is a sufficiently small scalar (ϵ<0) given arbitrarily and is introduced in order to approximate the equality condition in Formula G by inequality conditions. The problem of minimizing the sum of squares of jerk described in the first embodiment can be led to a problem of minimizing "σ" that satisfies the LMI in Formula E1.

Adding an evaluation item for preventing an excessive acceleration input will be considered next. This can be defined by the following LMI.

$$\begin{bmatrix} \delta & f^T \\ f & I \end{bmatrix} > 0 \qquad \text{[Formula G1]}$$

Formula G1 is an evaluation of the sum of squares of an acceleration input. By choosing an arbitrary constant as "δ", the sum of squares of the acceleration input can be limited to less than "δ", thereby preventing an excessive input.

The H2/H∞ norm minimization, the minimization of the sum of squares of jerk, and the LMI for limiting the sum of squares of an input described above are combined into an LMI that optimizes all evaluation items at the same time, as shown in Formula H1 given below.

$$\begin{bmatrix} P_{11} & P_{12} & A_\infty P_{11}+B_\infty C_f P_{12}^T & A_\infty P_{12}+B_\infty C_f P_{22} & B_\infty f_2 & 0 \\ (*)' & P_{22} & A_f P_{12}^T & A_f P_{22} & f_1 & 0 \\ (*)' & (*)' & P_{11} & P_{12} & 0 & P_{11}C_\infty^T+P_{12}C_f^T D_\infty^T \\ (*)' & (*)' & (*)' & P_{22} & 0 & P_{12}^T C_\infty^T+P_{22}C_f^T D_\infty^T \\ (*)' & (*)' & (*)' & (*)' & I & f_2^T D_\infty^T \\ (*)' & (*)' & (*)' & (*)' & (*)' & \mu I \end{bmatrix} > 0 \qquad \text{[Formula H1]}$$

$$\begin{bmatrix} W & C_f V P_{12}^T & C_f V P_{22} \\ (*)' & P_{11} & P_{12} \\ (*)' & (*)' & P_{22} \end{bmatrix} > 0,\ \mathrm{trace}(W) < \rho$$

$$\begin{bmatrix} \sigma & f^T \\ f & (H^T H)^{-1} \end{bmatrix} > 0,\ \begin{cases} A_{eq} f + B_{eq} + [\varepsilon\ \varepsilon]^T > 0 \\ A_{eq} f - B_{eq} - [\varepsilon\ \varepsilon]^T < 0 \end{cases}$$

-continued $$\begin{bmatrix} \delta & f^T \\ f & I \end{bmatrix} > 0$$

$$J := w_\infty \mu + w_2 \rho + w_J \sigma, \text{ minimize } J$$

where the LMI variables are $$\begin{bmatrix} P_{11} & P_{12} \\ P_{12}^T & P_{22} \end{bmatrix} = P = P^T > 0, f = \begin{bmatrix} f_1 \\ f_2 \end{bmatrix} \quad \text{[Formula I1]}$$

Here, "$w_\infty$", "$w_2$", and "$w_J$" are all positive values and are weighting factors introduced in order to minimize the H∞ norm, the H2 norm, and the sum of squares of jerk at the same time. The LMI in Formula H1 multiplies variables "$\mu$", "$\rho$", and "$\sigma$" corresponding to the H∞ norm, H2 norm, and the sum of squares of jerk by "$w_\infty$", "$w_2$", and "$w_J$", respectively, and minimizes the sum of the products as an objective function "J". Thus, "$w_\infty$", "$w_2$" and "$w_J$" serve to adjust the balance of simultaneous minimization. It is also possible to include the term "$\delta$" in the objective function "J".

If solutions "P" and "f" of the LMI in Formula H1 given above are found, an acceleration input vector "U" that minimizes the H2 norm (for approaching the target track more quickly), the H∞ norm (for reducing the power spectrum at the resonance frequency), and the sum of squares of jerk (the smoothness of control input) at the same time and prevents an excessive input are provided as the solution "f" of Formula I1.

An example of a process procedure for obtaining acceleration inputs according to the second embodiment will be described below. The process can be implemented by causing a processor such as a CPU to execute a program including an instruction code for implementing the present invention, for example. The process is performed off-line beforehand and the acceleration input at each sample time obtained here is associated with the seek distance and stored in the memory (acceleration input table) shown in FIG. 1.

First, the processor receives an input of a seek distance for generating acceleration data (a first input receiving step) and receives an input of seek period in which the seek over the seek distance is to be performed, or the number of samples which can be obtained by dividing the seek period by the sample time (a second input step).

Then the processor solves the LMI (linear matrix inequality) represented by Formula H1 given above so that the objective function $J := w_\infty \mu + w_2 \rho + w_J \sigma$ is minimized, thereby obtaining the acceleration "f" at each sample time (calculation step). The accelerations "f" at each sample time obtained is associated with the seek distance and stored in the memory (acceleration input table).

Result of a computer simulation performed to verify the effectiveness of an acceleration input vector "U" actually obtained using the LMI in Formula H1 will be given below.

In the computer simulation, an acceleration input vector obtained by using the LMI in Formula H1 and an acceleration input vector obtained by the calculation method of the first embodiment are input in 18 simulation plant models (with slightly different mechanical resonances) that take into consideration the resonance characteristic and variations in the arm/suspension, and the responses during settling are compared.

Here, acceleration inputs that enables a 10-track seek in 17-sample times (N=17) are obtained. To design the acceleration input vector "U" using the LMI in Formula H1, Pm(z) shown in Formula Q is used as a design plant model and the values of parameters "Kg" and "τ" in Formula J1 are used in Formula Q.

$$K_g = 3.9359 * 10^9, \tau = 3.7879 * 10^{-5} \quad \text{(Formula J1)}$$

Figure 11:
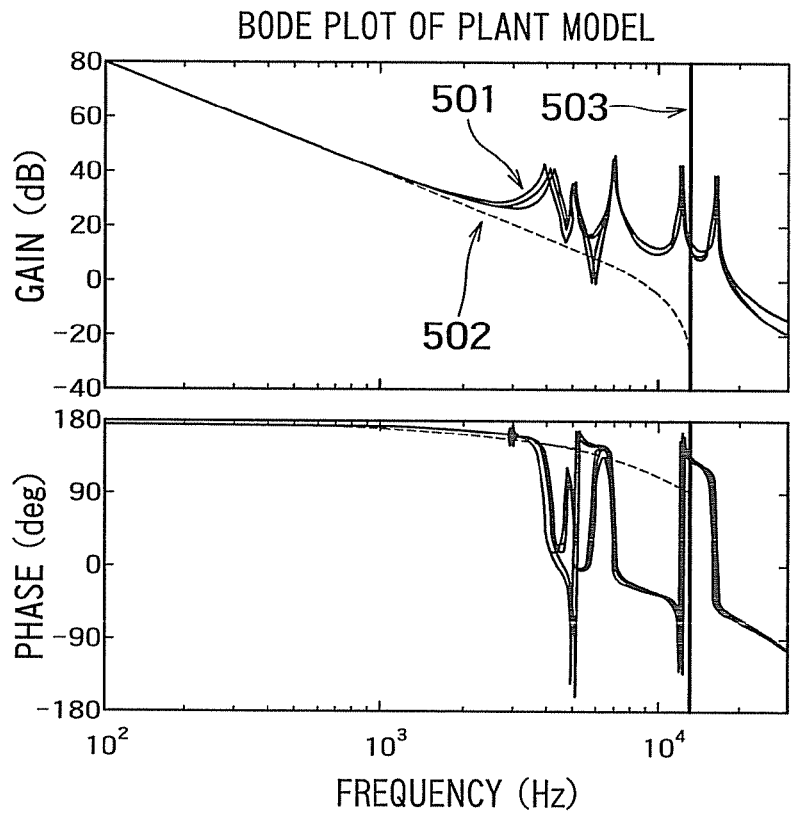
FIG. 11 is a diagram showing frequency responses of plant models.

FIG. 11 shows frequency characteristics of the simulation plant model and the design plant model. Curve 501 represents the frequency characteristic of the simulation plant model, curve 502 represents the frequency characteristic of the design plant model, and curve 503 represents the Nyquist frequency of the design plant model. The simulation plant model is a continuous system and the design plant model is a discrete system.

Design parameters for obtaining the acceleration input using the LMI in Formula H1 are shown below. First, a weight function W∞(z) for reducing the power spectrum around a mechanical resonance frequency was set as shown in Formula J2.

$$W_\infty(z) = \frac{148.7z^9 - 495z^8 + 869.1z^7 - 1075z^6 + 982.9z^5 - 671.1z^4 + 334.8z^3 - 97.44z^2 + 3.066z + 4.19}{z^9 - 1.192z^8 + 2.705z^7 - 1.608z^6 + 2.13z^5 - 0.2192z^4 + 0.4855z^3 + 0.312z^2 + 0.1139z + 0.01369} \quad \text{[Formula J2]}$$

Weighting factors "$w_\infty$", "$w_2$", and "$w_J$" that determine the balance of simultaneous minimization were set as $$w_\infty = 1, w_2 = 0.6, w_J = 1 \quad \text{[Formula K1]}$$

The parameter "$\delta$" for limiting the sum of squares of the acceleration input was set as $\delta = 1.3$ so that the sum squares is limited to less than 1.3 times the sum of squares of the acceleration input obtained using the calculation method of the first embodiment.

Figure 12:
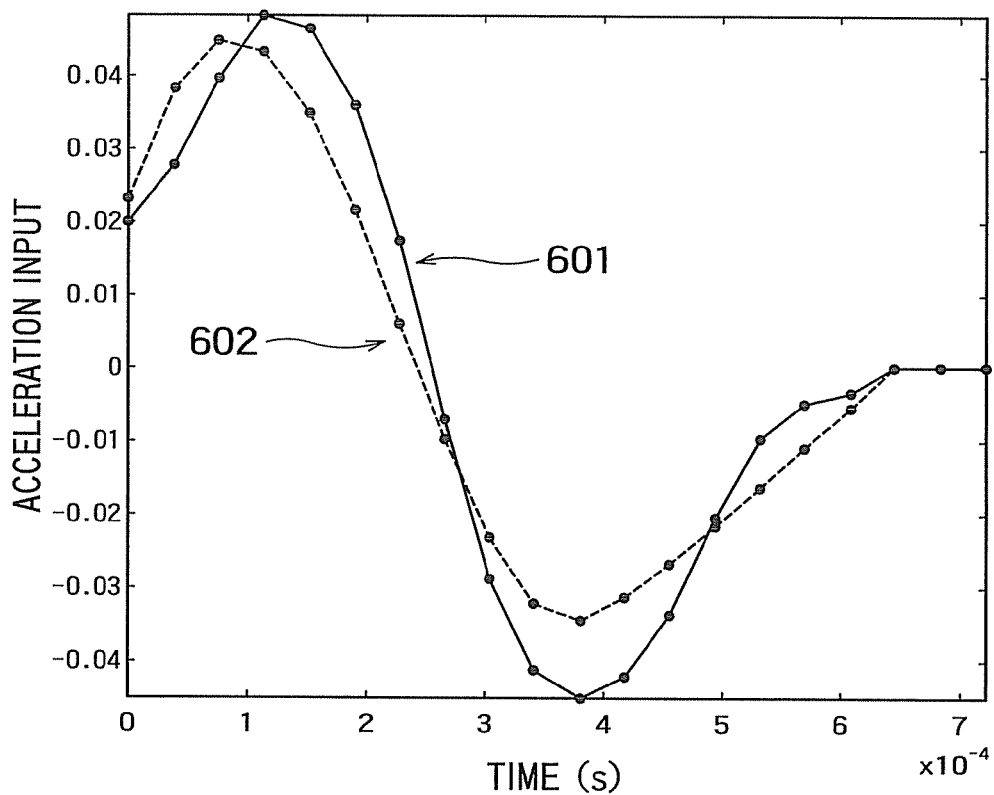
FIG. 12 is a diagram showing an exemplary comparison of acceleration inputs according to a second embodiment of the present invention and the first embodiment.

With the settings given above, the LMI in Formula H1 was solved to obtain acceleration inputs. FIG. 12 shows the waveforms of the acceleration inputs obtained. Curve 601 represents the waveform of the acceleration input obtained according to the second embodiment of the present invention and curve 602 represents the waveform of the acceleration input obtained according to the first embodiment of the present invention. It can be seen that the acceleration input according to Formula H1, like the acceleration input according to the first embodiment, has peaks, each in the acceleration region and the deceleration region and the switching between the acceleration and deceleration occurs before the intermediate time between the start and end of the seek.

Figure 13:
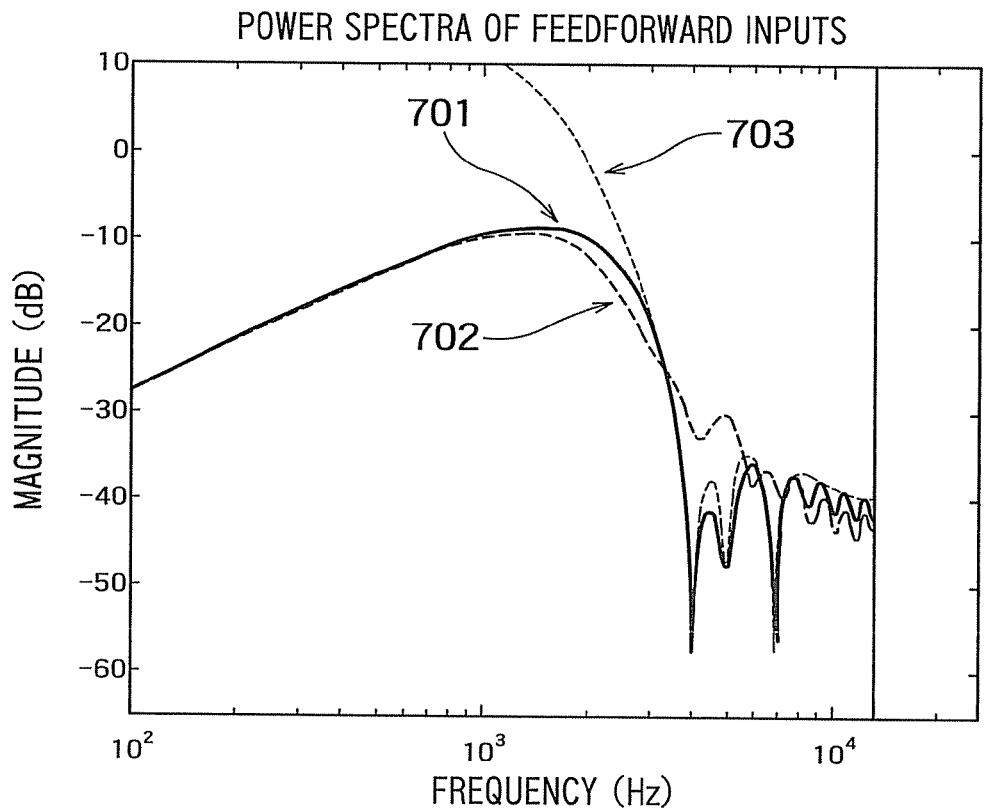
FIG. 13 is a diagram showing exemplary power spectra of acceleration inputs and weighting function according to the first and second embodiments of the present invention.

FIG. 13 shows the power spectra of the acceleration input vectors and the frequency response of (the inverse system of) the frequency weight function W∞(z) of Formula J2. Curve 701 represents the power spectrum of the acceleration input according to the second embodiment of the present invention, curve 702 represents the power spectrum of the acceleration input according to the first embodiment of the present invention, and curve 703 represents the frequency response of the inverse system of the frequency weight function W∞(z). As represented by curve 701, the power spectrum of the acceleration input according to Formula H1 is frequency-shaped with the weight function W∞(z) and the power spectrum is locally reduced near the frequency at which a resonance exists in the plant model as compared with the acceleration input (dashed line) according to the first embodiment.

Figure 14:
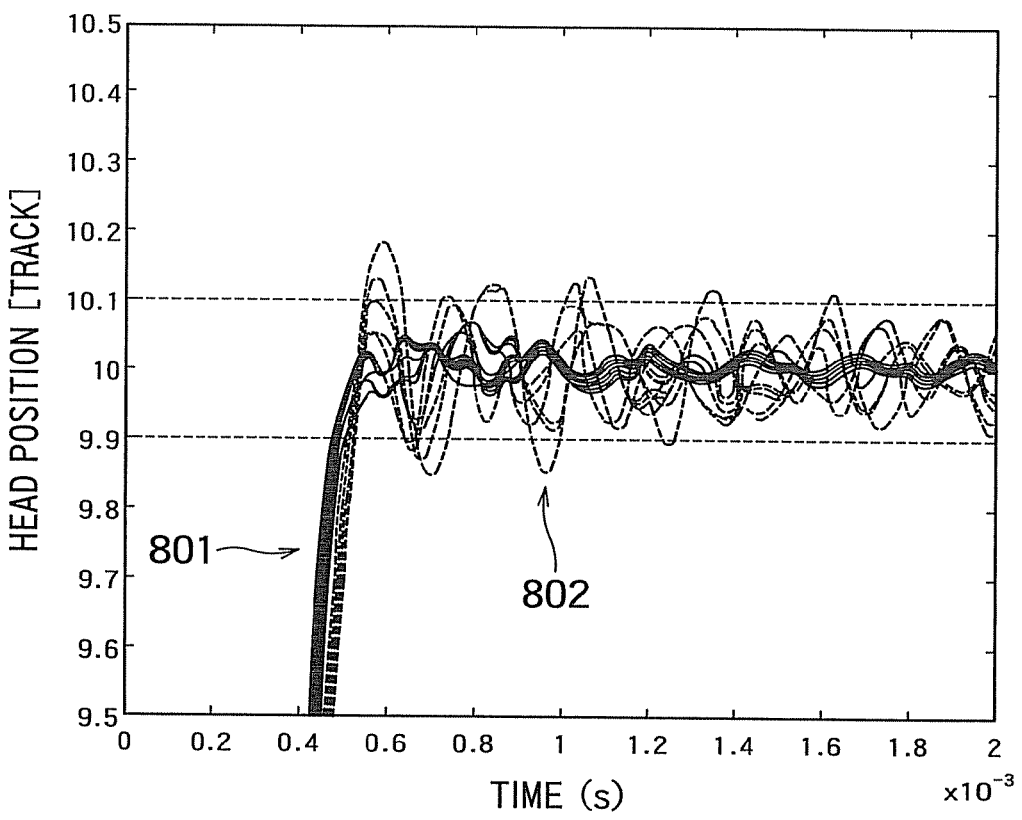
FIG. 14 is a diagram showing a comparison of settling responses during a 10-track seek according to the first and second embodiments.

FIG. 14 shows settling responses (results of simulations) at 10-track seeks when the acceleration input obtained according to Formula H1 and the acceleration input obtained according to the first embodiment were used. The solid curves 801 represent the settling waveforms of 10-track seeks according to the second embodiment of the present invention and the dashed curves 802 represent the settling waveforms of 10-track seeks according to the first embodiment of the present invention. Portions between the dashed lines in FIG. 14 is the region equivalent to +/−10% with respect to the target track. It can be said that seeks that converge in the region more quickly are better seeks. It can be seen from FIG. 14 that the settling responses of the acceleration inputs according to Formula H1 are less oscillatory than the acceleration inputs of the first embodiment and therefore the acceleration inputs according to Formula H1 have a greater effect of reducing excitation of resonance than the acceleration inputs according to the first embodiment. Furthermore, the time required to reach near the target track was almost the same as the seek response according to the first embodiment and therefore the effect of the target trajectory design with the minimization of the H2 norm has been also verified.

The results given above demonstrate the effectiveness of the second embodiment of the present invention.

What is claimed is:

1. A method for generating acceleration data used in feed-forward control of head seeking, comprising:
   receiving a seek distance for which the acceleration data is generated;
   receiving a seek period in which a seek over the seek distance is to be performed or a count of samples corresponding to the seek period;
   determining a weighting factor for a change rate of an acceleration between each adjacent sample times, respectively and
   calculating an optimum acceleration to be added to a head at each sample time, respectively, by minimizing an objective function which defines a weighting sum of squares of the change rates of accelerations between each adjacent sample times by each weighting factor, under a constraint condition based on variables representing accelerations to be added at each sample time, either the seek period or the count of samples, and the seek distance.

2. The method according to claim 1, wherein the objective function is defined by $$J = (QCU)^T (QCU)$$

and the constraint condition is defined by $$\sum_{k=0}^{N-1} k u[N-1-k] = const$$

$$\sum_{k=0}^{N} u[k] = 0$$

where N is the count of the samples, u[k] is an acceleration at the sample time k, and U, C, and Q are defined by $$U = [u[0], u[1], \ldots, u[N-1]]^T,$$

$$C = \begin{bmatrix} 1 & 0 & 0 & 0 & 0 \\ -1 & 1 & 0 & \ldots & 0 \\ 0 & -1 & 1 & \ldots & 0 \\ \vdots & \ddots & \ddots & \ddots & \vdots \\ 0 & \ldots & 0 & -1 & 1 \\ 0 & \ldots & \ldots & 0 & 1 \end{bmatrix},$$

$$Q = \begin{bmatrix} \sqrt{q_0} & & & & \\ & \sqrt{q_1} & & & \\ & & \ddots & & \\ & & & \ddots & \\ & & & & \sqrt{q_{N-1}} \end{bmatrix}$$

where $\sqrt{q_k}$ (0≤k≤N−1) is a weight assigned to a change rate of acceleration between sample times k and k−1.

3. The method according to claim 2, wherein, in the determining the weighting factor,
   when the sample time k is greater than or equal to 0 and less than a first threshold, $\sqrt{q_k}$ is set to a value smaller than a reference value;
   when the sample time k is greater than or equal to the first threshold and less than or equal to a second threshold, $\sqrt{q_k}$ is set to the reference value; and
   when the sample time k is greater than the second threshold, $\sqrt{q_k}$ is set to a value greater than the reference value.

4. The method according to claim 3, wherein, in the determining the weighting factor,
   when the sample time k is greater than or equal to 0 and less than the first threshold, $\sqrt{q_k}$ is increased as k increases; and
   when the sample time k is greater than the second threshold, $\sqrt{q_k}$ is increased as k increases.

5. The method according to claim 4, wherein in the determining the weighting factor;
   $\sqrt{q_k}$ is set according to $$\sqrt{q_k} = 1 - \alpha \frac{n_s - k}{n_s} \quad (0 < \alpha < 1) \text{ when } 0 \le k < n_s, \text{ and}$$

$$\sqrt{q_k} = 1 + \beta \frac{n_E - k}{n_E - (N-1)} \quad (0 < \beta < 1) \text{ when } n_E < k \le N-1,$$

where $n_s$ is the first threshold, $n_E$ is the second threshold, and α and β are arbitrary constants.

6. A method for generating acceleration data used in feed-forward control of head seeking, comprising:
   receiving a seek distance r for which the acceleration data is generated;
   receiving a seek period in which a seek over the seek distance r is to be performed or a count of samples N corresponding to the seek period; and
   calculating an acceleration f to be added to a head at each sample time respectively by solving an LMI (Linear Matrix Inequality) represented by $$\begin{bmatrix} P_{11} & P_{12} & A_\infty P_{11} + B_\infty C_f P_{12}^T & A_\infty P_{12} + B_\infty C_f P_{22} & B_\infty f_2 & 0 \\ (*)' & P_{22} & A_f P_{12}^T & A_f P_{22} & f_1 & 0 \\ (*)' & (*)' & P_{11} & P_{12} & 0 & P_{11} C_\infty^T + P_{12} C_f^T D_\infty^T \\ (*)' & (*)' & (*)' & P_{22} & 0 & P_{12}^T C_\infty^T + P_{22} C_f^T D_\infty^T \\ (*)' & (*)' & (*)' & (*)' & I & f_2^T D_\infty^T \\ (*)' & (*)' & (*)' & (*)' & (*)' & \mu I \end{bmatrix} > 0$$

$$\begin{bmatrix} W & C_f V P_{12}^T & C_f V P_{22} \\ (*)' & P_{11} & P_{12} \\ (*)' & (*)' & P_{22} \end{bmatrix} > 0, \text{trace}(W) < \rho$$

$$\begin{bmatrix} \sigma & f^T \\ f & (H^T H)^{-1} \end{bmatrix} > 0, \begin{cases} A_{eq} f - B_{eq} + [\varepsilon \ \varepsilon]^T > 0 \\ A_{eq} f - B_{eq} - [\varepsilon \ \varepsilon]^T < 0 \end{cases}$$

$$\begin{bmatrix} \delta & f^T \\ f & I \end{bmatrix} > 0$$

so that an objective function $J := w_\infty + w_2 + w_J$ is minimized; where $$\begin{bmatrix} P_{11} & P_{12} \\ P_{12}^T & P_{22} \end{bmatrix} = P = P^T > 0, f = \begin{bmatrix} f_1 \\ f_2 \end{bmatrix},$$

$$f_1 = \begin{bmatrix} u[N-1] \\ u[N-2] \\ \vdots \\ u[2] \\ u[1] \end{bmatrix}, f_2 = u[0]$$

and

N is the count of the samples, $u[k]$ is an acceleration at the sample time k, and $\epsilon$ and $\delta$ are arbitrary positive constants, and matrix coefficients are defined as $$A_f = \begin{bmatrix} 0 & \cdots & \cdots & \cdots & \cdots & 0 \\ 1 & 0 & & & & \vdots \\ 0 & 1 & 0 & & & \vdots \\ \vdots & \ddots & \ddots & \ddots & & \vdots \\ \vdots & & \ddots & \ddots & \ddots & \vdots \\ 0 & \cdots & \cdots & 0 & 1 & 0 \end{bmatrix}, C_f = [0 \ 0 \ \cdots \ 0 \ 1]$$

$$V = -K_g \cdot \frac{\tau^2}{2} \cdot \begin{bmatrix} 1 & 0 & \cdots & \cdots & \cdots & \cdots & 0 \\ 3 & 1 & 0 & & & & \vdots \\ 5 & 3 & 1 & 0 & & & \vdots \\ \vdots & & & \ddots & \ddots & & \vdots \\ \vdots & & & & 1 & 0 & \vdots \\ 2N-1 & & & & 3 & 1 & 0 \\ 2N-3 & 2N-1 & \cdots & \cdots & 5 & 3 & 1 \end{bmatrix}$$

-continued $$A_{eq} = K_g \cdot \frac{\tau^2}{2} \cdot \begin{bmatrix} 2N-3 & 2N-1 & \cdots & 5 & 3 & 1 \\ 1 & 1 & \cdots & 1 & 1 & 1 \end{bmatrix}, B_{eq} = \begin{bmatrix} r \\ 0 \end{bmatrix}$$

where $\tau$ is sample time, r is a seek distance, $K_g$ is a gain of a discrete second-order integral $$P_m(z) = \{A_m, B_m, C_m, 0\}$$

$$A_m = \begin{bmatrix} 1 & \tau \\ 0 & 1 \end{bmatrix}, B_m = \begin{bmatrix} K_g \cdot \frac{\tau^2}{2} \\ K_g \cdot \tau \end{bmatrix}, C_m = [1 \ 0]$$

which is a plant model of a head seek controller, and $A\infty$, $B\infty$, $C\infty$, and $D\infty$ are defined by an arbitrary transfer function $$W_\infty(z) = \{A_\infty, B_\infty, C_\infty, D_\infty\},$$

and $$H = \begin{bmatrix} 1 & 0 & 0 & 0 & 0 \\ -1 & 1 & 0 & \cdots & 0 \\ 0 & -1 & 1 & \cdots & 0 \\ \vdots & \ddots & \ddots & \ddots & \vdots \\ 0 & \cdots & 0 & -1 & 1 \\ 0 & \cdots & \cdots & 0 & 1 \end{bmatrix}$$

where $w_\infty$, $w_2$, and $w_j$ are arbitrary positive constants.

* * * * *